US012437698B2

(12) United States Patent

Kim

(10) Patent No.: US 12,437,698 B2
(45) Date of Patent: Oct. 7, 2025

(54) DRIVER AND DISPLAY DEVICE INCLUDING THE SAME

(71) Applicant: Samsung Display Co., Ltd., Yongin-Si (KR)

(72) Inventor: Keunwoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/442,101

(22) Filed: Feb. 15, 2024

(65) Prior Publication Data

US 2025/0014497 A1 Jan. 9, 2025

(30) Foreign Application Priority Data

Jul. 4, 2023 (KR) ........................ 10-2023-0086550

(51) Int. Cl.

*G09G 3/3266* (2016.01)
*G09G 3/20* (2006.01)

(52) U.S. Cl.

CPC ... *G09G 3/2092* (2013.01); *G09G 2310/0267* (2013.01); *G09G 2310/0286* (2013.01); *G09G 2330/021* (2013.01)

(58) Field of Classification Search

CPC ......... G09G 3/2092; G09G 2310/0267; G09G 2310/0286; G09G 2330/021; G09G 3/3266; G09G 3/32; H10D 86/60; H10H 29/142

See application file for complete search history.

(56) References Cited

U.S. PATENT DOCUMENTS

| | | | | | |
|---|---|---|---|---|---|
| 10,482,817 | B2 | 11/2019 | Kim et al. | | |
| 10,902,778 | B2 | 1/2021 | Kim et al. | | |
| 11,348,522 | B2 | 5/2022 | Kim et al. | | |
| 2006/0066512 | A1* | 3/2006 | Afentakis | G09G 3/20 | 345/55 |
| 2010/0182302 | A1* | 7/2010 | Ueda | G09G 3/296 | 345/55 |
| 2011/0198484 | A1* | 8/2011 | Kurokawa | H10D 86/423 | 250/214 R |
| 2012/0169707 | A1* | 7/2012 | Ebisuno | G09G 3/3233 | 345/212 |
| 2015/0060847 | A1* | 3/2015 | Miyake | H10D 30/6734 | 257/43 |
| 2015/0255018 | A1* | 9/2015 | Aoki | G09G 3/20 | 345/76 |
| 2021/0118375 | A1* | 4/2021 | Yang | G09G 3/3266 | |

(Continued)

FOREIGN PATENT DOCUMENTS

| | | | |
|---|---|---|---|
| CN | 108154846 | A | 6/2018 |
| KR | 10-2566551 | B1 | 8/2023 |

*Primary Examiner* — Jose R Soto Lopez
(74) *Attorney, Agent, or Firm* — Innovation Counsel LLP

(57) ABSTRACT

A driver is disclosed that includes an input circuit that transmits an input signal to a first node in response to at least one of a clock signal and an inverted clock signal, and an inverter that generates an output signal based on a voltage of the first node. Each of the input circuit and the inverter includes a first transistor and a second transistor connected to each other, an active area of the first transistor and an active area of the second transistor include different materials, and a gate terminal of the second transistor is electrically connected to a semiconductor material spaced apart from the active area of the second transistor.

9 Claims, 11 Drawing Sheets

(56) References Cited

U.S. PATENT DOCUMENTS

| | | | | |
|---|---|---|---|---|
| 2022/0157915 | A1* | 5/2022 | Lee | H10K 59/131 |
| 2022/0351673 | A1* | 11/2022 | Kim | G09G 3/32 |
| 2022/0366849 | A1* | 11/2022 | Lee | H10K 59/131 |
| 2023/0317701 | A1* | 10/2023 | Kim | H01L 25/0753 257/79 |
| 2024/0087502 | A1* | 3/2024 | Kammler | G09G 3/32 |
| 2024/0212773 | A1* | 6/2024 | Liu | G11C 19/28 |
| 2024/0395199 | A1* | 11/2024 | Li | G09G 3/3208 |
| 2024/0420644 | A1* | 12/2024 | Gui | G09G 3/3266 |
| 2025/0054428 | A1* | 2/2025 | Zhang | G09G 3/20 |

* cited by examiner

DRIVER AND DISPLAY DEVICE INCLUDING THE SAME

CROSS-REFERENCE TO RELATED APPLICATION(S)

This application claims priority under 35 USC § 119 to Korean Patent Application No. 10-2023-0086550 filed on Jul. 4, 2023, in the Korean Intellectual Property Office (KIPO), the entire disclosure of which is incorporated by reference herein.

BACKGROUND

1. Field

Embodiments relate to a driver and a display device including the same.

2. Description of the Related Art

A driver of a display device (e.g., a gate driver or a light emitting driver) may sequentially provide signals (e.g., a gate signal or a light emitting signal) to pixels of a display panel row by row. To sequentially provide the signals row by row, the driver may be implemented in a form of a shift register including a plurality of stages.

Each stage of the driver may include a transistor including a silicon semiconductor or a transistor including an oxide semiconductor. The transistor including the silicon semiconductor has an advantage of supplying a stable driving current, and the transistor including the oxide semiconductor has an advantage of fast turn-on operation and excellent off-current characteristics.

SUMMARY

Embodiments may provide a driver with reduced power consumption.

Embodiments may provide a display device including the driver.

A driver according to an embodiment of the present disclosure includes an input circuit that transmits an input signal to a first node in response to at least one of a clock signal and an inverted clock signal, and an inverter that generates an output signal based on a voltage of the first node. Each of the input circuit and the inverter includes a first transistor and a second transistor connected to each other, an active area of the first transistor and an active area of the second transistor include different materials, and a gate terminal of the second transistor is electrically connected to a semiconductor material spaced apart from the active area of the second transistor.

In an embodiment, the gate terminal of the second transistor may include an upper gate terminal and a lower gate terminal, and the upper gate terminal may be electrically connected to the lower gate terminal.

In an embodiment, the semiconductor material may be connected to the upper gate terminal and the lower gate terminal, and the upper gate terminal may be electrically connected to the lower gate terminal through the semiconductor material.

In an embodiment, the semiconductor material may be in Schottky contact with the upper gate terminal and the lower gate terminal.

In an embodiment, each of a work function of the upper gate terminal and a work function of the lower gate terminal may be greater than a work function of the semiconductor material.

In an embodiment, the semiconductor material may be in ohmic contact with the upper gate terminal and the lower gate terminal.

In an embodiment, the first transistor may be a PMOS transistor, and the second transistor may be an NMOS transistor.

In an embodiment, the active area of the first transistor may include a silicon semiconductor, and the active area of the second transistor may include an oxide semiconductor.

In an embodiment, the inverter may include a first inverter that inverts a voltage of the first node and provides an inverted voltage to a second node, and a second inverter that inverts a voltage of the second node and generates the output signal.

A display device according to an embodiment of the present disclosure includes a substrate, a first active pattern disposed on the substrate, a first gate electrode disposed on the first active pattern, a semiconductor pattern disposed on the first gate electrode, and including a material different from a material of the first active pattern, a second active pattern disposed on the first gate electrode, spaced apart from the semiconductor pattern, and including a material different from the material of the first active pattern, and a second gate electrode disposed on the semiconductor pattern and the second active pattern, and connected to the semiconductor pattern through a first contact hole.

In an embodiment, the first active pattern may include a silicon semiconductor, and each of the semiconductor pattern and the second active pattern may include an oxide semiconductor.

In an embodiment, the display device may further include a third gate electrode disposed between the first gate electrode and the semiconductor pattern. The semiconductor pattern and the second active pattern may be disposed on a same layer.

In an embodiment, the semiconductor pattern may be in Schottky contact with the second gate electrode through the first contact hole, and may be in Schottky contact with the third gate electrode through a second contact hole.

In an embodiment, each of a work function of the second gate electrode and a work function of the third gate electrode may be greater than a work function of the semiconductor pattern.

In an embodiment, the second active pattern may be disposed on the semiconductor pattern, and the semiconductor pattern may be in Schottky contact with the second gate electrode through the first contact hole.

In an embodiment, the first active pattern may include a P-type impurity, and the second active pattern may include an N-type impurity.

A display device according to an embodiment of the present disclosure includes a substrate, a first active pattern disposed on the substrate, a first gate electrode disposed on the first active pattern, a second gate electrode disposed on the first gate electrode, a semiconductor pattern disposed on the second gate electrode, connected to the second gate electrode through a contact hole, and including a material different from a material of the first active pattern, a second active pattern disposed on a same layer as the semiconductor pattern, spaced apart from the semiconductor pattern, and including a material different from the material of the first active pattern, and a third gate electrode disposed on the semiconductor pattern and the second active pattern, spaced apart from the semiconductor pattern in a plan view, and electrically connected to the semiconductor pattern.

In an embodiment, the first active pattern may include a silicon semiconductor, and each of the semiconductor pattern and the second active pattern may include an oxide semiconductor.

In an embodiment, the semiconductor pattern may be in ohmic contact with the third gate electrode through the contact hole.

In an embodiment, the first active pattern may include a P-type impurity, and each of the semiconductor pattern and the second active pattern may include an N-type impurity.

In a driver according to embodiments of the present disclosure, a stage of the driver may include first, second, third, and fourth transistors including a silicon semiconductor and fifth, sixth, and seventh transistors including an oxide semiconductor. Each of the fifth, sixth, and seventh transistors may include an upper gate terminal, a lower gate terminal, and a semiconductor material. As the semiconductor material makes a Schottky contact or ohmic contact with the upper gate terminal and the lower gate terminal, a voltage applied to the lower gate terminal may be lowered, and a threshold voltage of each of the fifth, sixth, and seventh transistors may increase. In addition, since each of the fifth, sixth, and seventh transistors have a double gate structure, output current may increase. Therefore, the driver may require a relatively small number of buffer transistors, and thus a dead space of a display device including the driver may be reduced.

In addition, each of the first, second, third, and fourth transistors may be a PMOS transistor, and each of the fifth, sixth, and seventh transistors may be an NMOS transistor. As the stage of the driver includes a CMOS circuit, power consumption of the driver and the display device including the driver may be reduced.

DETAILED DESCRIPTION OF THE EMBODIMENTS

Figure 1:
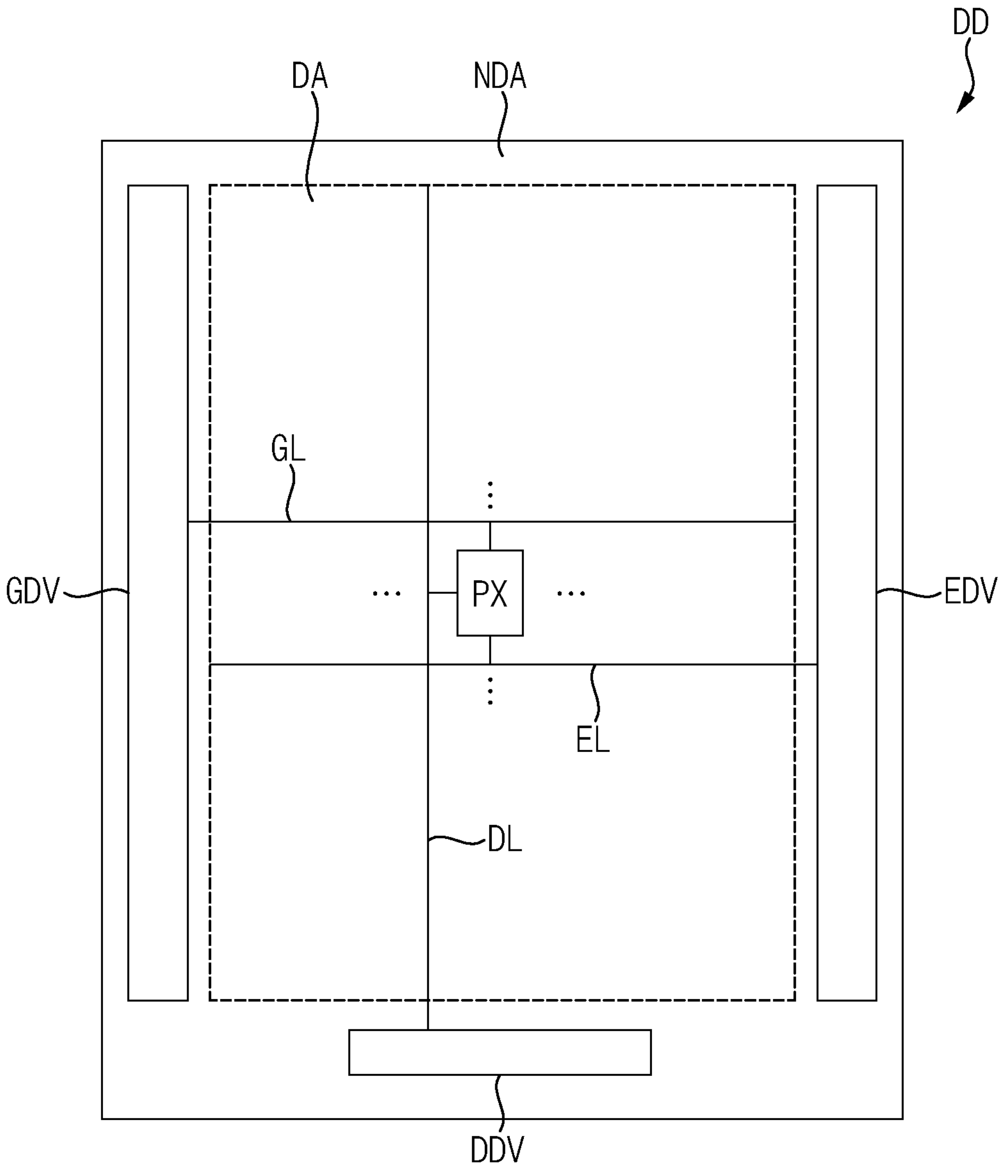
FIG. 1 is a plan view illustrating a display device according to embodiments of the present disclosure.

Hereinafter, embodiments of the present disclosure will be described in more detail with reference to the accompanying drawings. The same reference numerals are used for the same components in the drawings, and redundant descriptions of the same components will be omitted.

Figure 2:
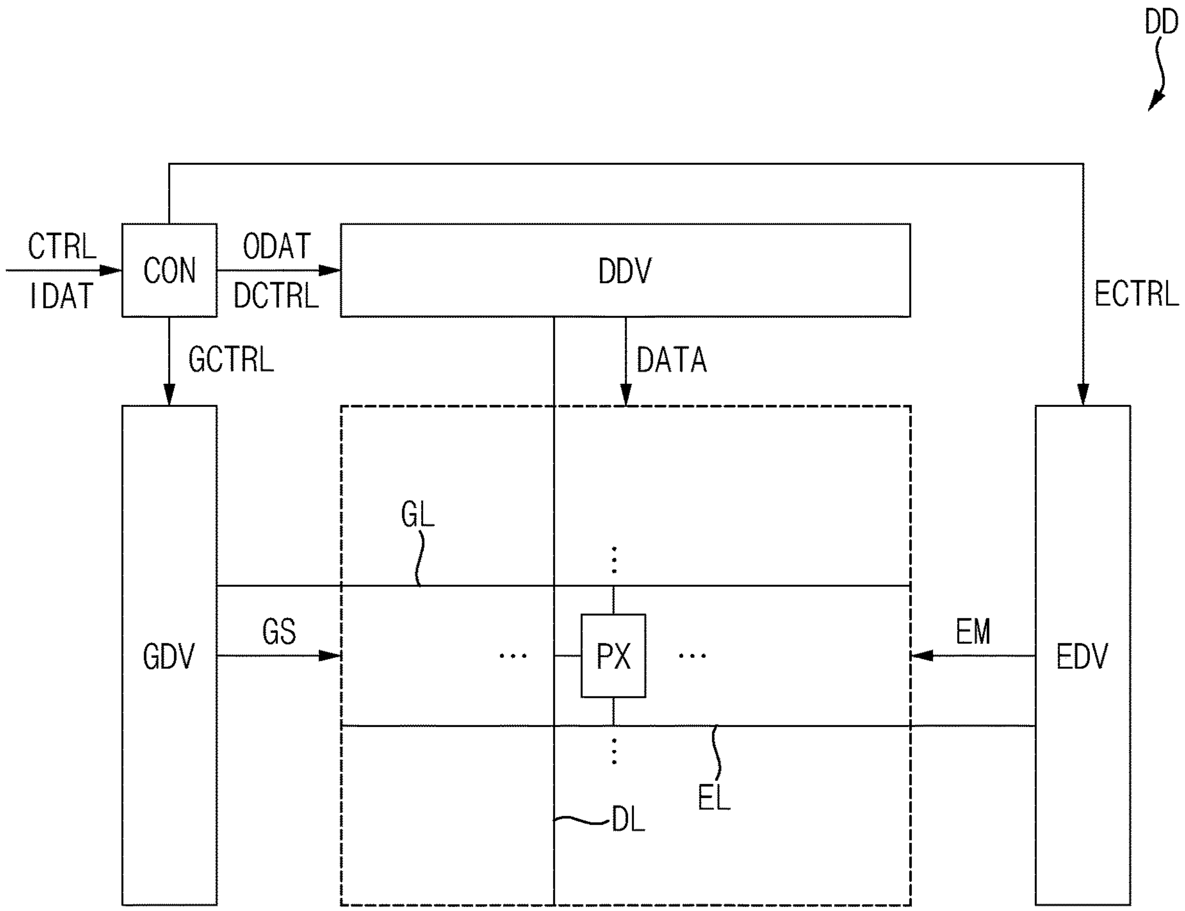
FIG. 2 is a block diagram illustrating the display device of FIG. 1.

FIG. 1 is a plan view illustrating a display device according to embodiments of the present disclosure. FIG. 2 is a block diagram illustrating the display device of FIG. 1.

Referring to FIGS. 1 and 2, a display device DD may include a display area DA and a non-display area NDA.

The display area DA may be an area that displays an image. A plurality of pixels PX may be disposed in the display area DA. As the pixels PX emit light, the display area DA may display an image.

The non-display area NDA may be an area that does not display an image. The non-display area NDA may surround at least a portion of the display area DA. For example, the non-display area NDA may entirely surround the display area DA. A driver that provides a signal or a voltage to the pixels PX may be disposed in the non-display area NDA. For example, the driver may include a gate driver GDV, a light emitting driver EDV, a data driver DDV, and a controller CON.

Each of the pixels PX may be electrically connected to the gate driver GDV, the light emitting driver EDV, and the data driver DDV. Specifically, each of the pixels PX may be connected to the gate driver GDV through a gate line GL, may be connected to the light emitting driver EDV through a light emitting line EL, and may be connected to the data driver DDV through a data line DL. Accordingly, each of the pixels PX may receive a gate signal GS, a light emitting signal EM, and a data voltage DATA.

The gate driver GDV may receive a gate control signal GCTRL from the controller CON. The gate driver GDV may generate the gate signal GS based on the gate control signal GCTRL. The gate signal GS may be provided to each of the pixels PX through the gate line GL.

The light emitting driver EDV may receive a light emitting control signal ECTRL from the controller CON. The light emitting driver EDV may generate the light emitting signal EM based on the light emitting control signal ECTRL. The light emitting signal EM may be provided to each of the pixels PX through the light emitting line EL.

The data driver DDV may receive a data control signal DCTRL and output image data ODAT from the controller CON. The data driver DDV may generate the data voltage DATA based on the data control signal DCTRL and the output image data ODAT. The data voltage DATA may be provided to each of the pixels PX through the data line DL.

The controller CON may receive a control signal CTRL and input image data IDAT from an external device (e.g., GPU). The controller CON may generate the gate control signal GCTRL, the light emitting control signal ECTRL, the data control signal DCTRL, and the output image data ODAT based on the control signal CTRL and the input image data IDAT. The controller CON may control the gate driver GDV, the light emitting driver EDV, and the data driver DDV.

In FIG. 1, the gate driver GDV is illustrated as being disposed on a first side of the display device DD, and the light emitting driver EDV is illustrated as being disposed on a second side of the display device DD, but the present disclosure is not limited thereto. In another embodiment, the gate driver GDV and the light emitting driver EDV may be disposed together on the first side or the second side of the display device DD. In still another embodiment, the gate driver GDV and the light emitting driver EDV may be integrally formed.

Figure 3:
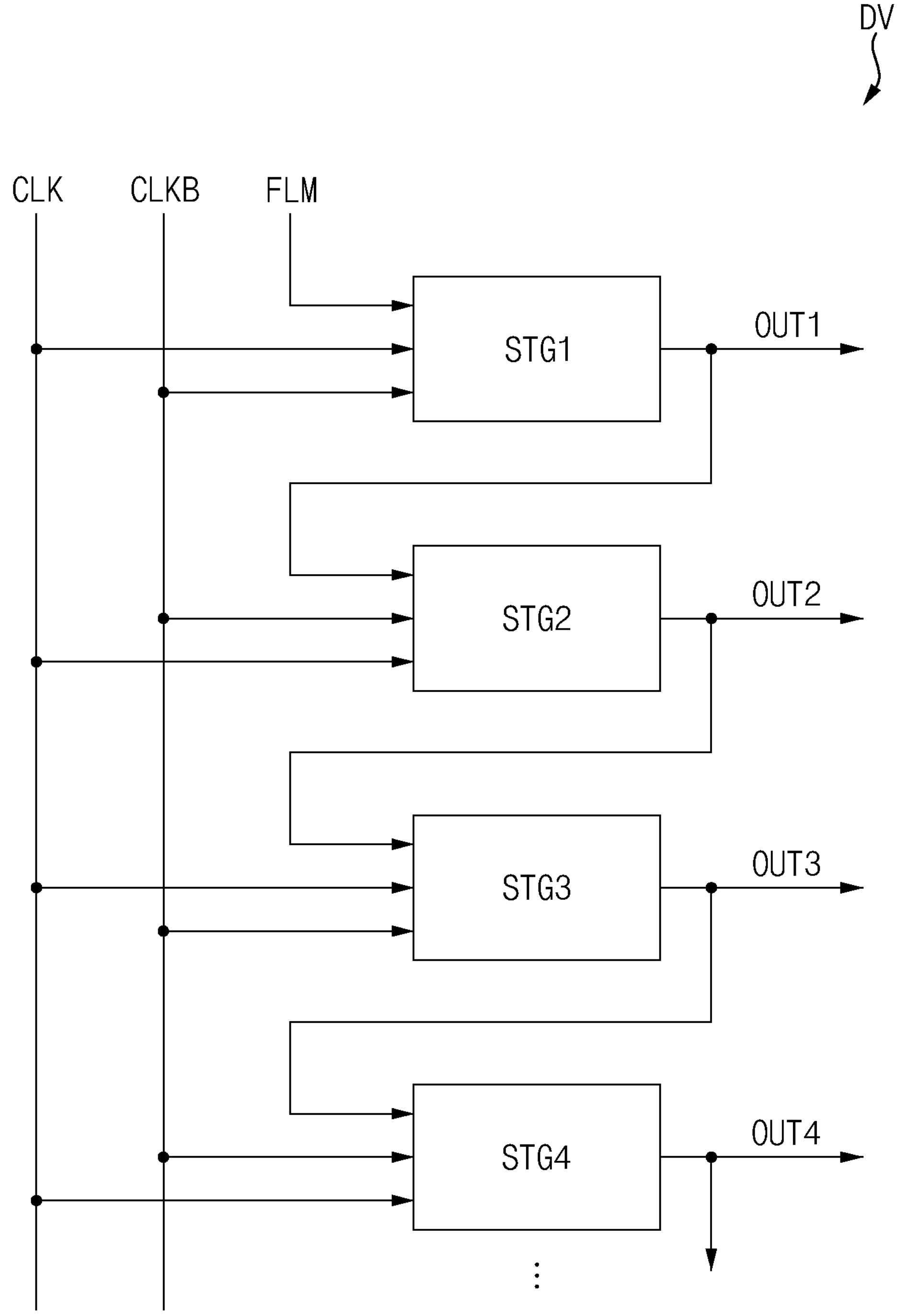
FIG. 3 is a block diagram illustrating a driver included in the display device of FIG. 1.

FIG. 3 is a block diagram illustrating a driver included in the display device of FIG. 1.

Referring to FIGS. 1 and 3, the display device DD may include a driver DV. In an embodiment, the driver DV may be the gate driver GDV or the light emitting driver EDV.

The driver DV may include a plurality of stages STG1, STG2, STG3, STG4, etc. The driver DV may be implemented in a form of a shift register in which the stages STG1, STG2, STG3, STG4, etc. sequentially output signals OUT1, OUT2, OUT3, OUT4, etc.

The stages STG1, STG2, STG3, STG4, etc. may sequentially output the output signals OUT1, OUT2, OUT3, OUT4, etc. based on a start signal FLM, a clock signal CLK, and an inverted clock signal CLKB. In addition, the first stage STG1 may receive the start signal FLM as an input signal, and each of subsequent stages STG2, STG3, STG4, etc. may receive an output signal of a previous stage as an input signal. For example, the second stage STG2 may receive a first output signal OUT1 of the first stage STG1 as an input signal, the third stage STG3 may receive a second output signal OUT2 of the second stage STG2 as an input signal, and the fourth stage STG4 may receive a third output signal OUT3 of the third stage STG3 as an input signal.

Figure 4:
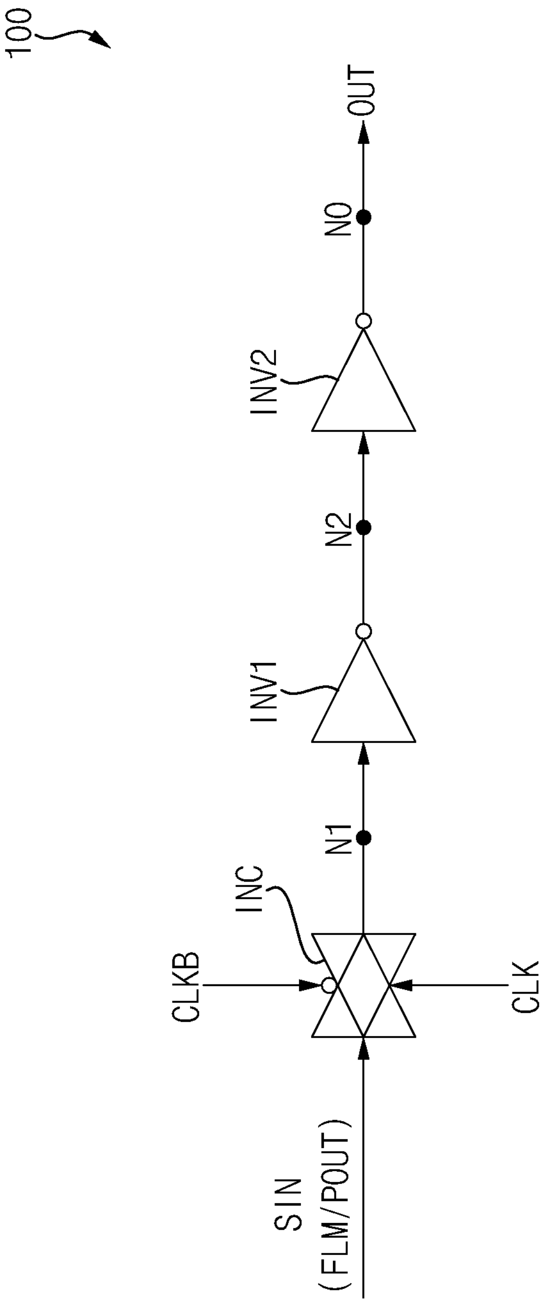
FIG. 4 is a block diagram illustrating a stage of the driver of FIG. 3.
Figure 5:
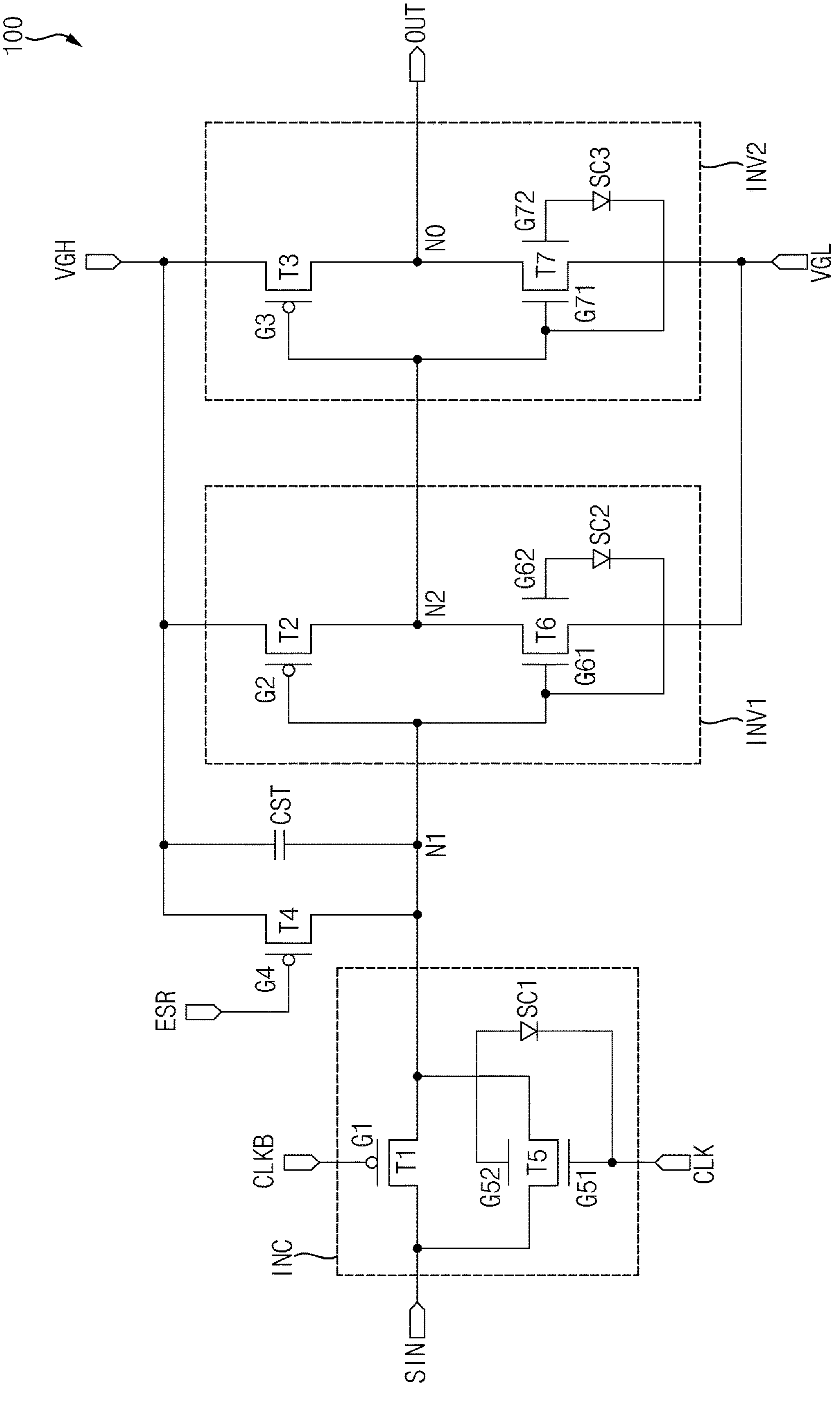
FIG. 5 is a circuit diagram illustrating a stage of a driver according to an embodiment of the present disclosure.
Figure 6:
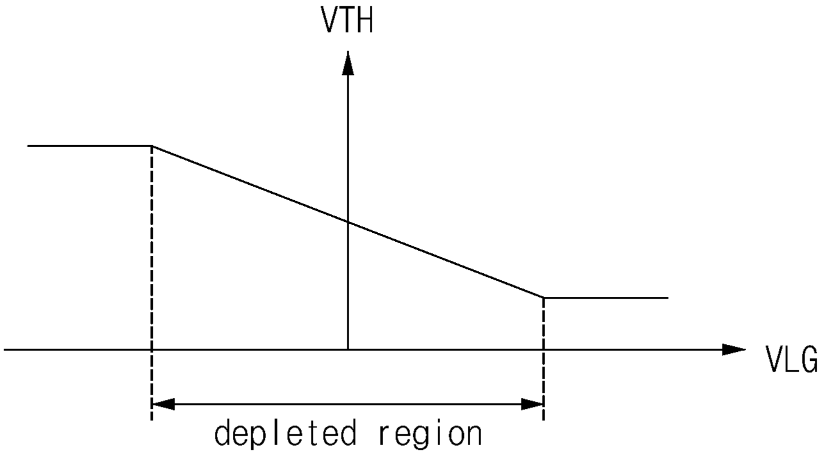
FIG. 6 is a graph illustrating a change in a threshold voltage of a transistor according to a voltage applied to a lower gate terminal of the transistor.

FIG. 4 is a block diagram illustrating a stage of the driver of FIG. 3. FIG. 5 is a circuit diagram illustrating a stage of a driver according to an embodiment of the present disclosure. FIG. 6 is a graph illustrating a change in a threshold voltage of a transistor according to a voltage applied to a lower gate terminal of the transistor.

Referring to FIGS. 3, 4, 5, and 6, a stage 100 may include an input circuit INC and inverters INV1 and INV2. In addition, the stage 100 may include a first transistor T1, a second transistor T2, a third transistor T3, a fourth transistor T4, a fifth transistor T5, a sixth transistor T6, a seventh transistor T7, and a storage capacitor CST.

The input circuit INC may transmit an input signal SIN to a first node N1. Specifically, the input circuit INC may transmit the input signal SIN to the first node N1 in response to at least one of the clock signal CLK and the inverted clock signal CLKB. In an embodiment, the input circuit INC of the first stage STG1 of the driver DV may receive the start signal FLM as the input signal SIN, and each of the subsequent stages STG2, STG3, STG4, etc. may receive an output signal OUT of the previous stage as the input signal SIN.

The input circuit INC may include the first transistor T1 and the fifth transistor T5. In an embodiment, the first transistor T1 and the fifth transistor T5 may be connected in parallel.

In an embodiment, the first transistor T1 may be a PMOS transistor, and the fifth transistor T5 may be an NMOS transistor. That is, the input circuit INC may be implemented as a CMOS transmission gate including the first transistor T1 and the fifth transistor T5.

The first transistor T1 may include a gate terminal G1, a first terminal, and a second terminal. The gate terminal G1 of the first transistor T1 may receive the inverted clock signal CLKB. The first terminal of the first transistor T1 may receive the input signal SIN. The second terminal of the first transistor T1 may be connected to the first node N1. The first transistor T1 may transmit the input signal SIN to the first node N1 in response to the inverted clock signal CLKB.

The fifth transistor T5 may include an upper gate terminal G51, a lower gate terminal G52, a first terminal, a second terminal, and a semiconductor material SC1. The upper gate terminal G51 of the fifth transistor T5 may receive the clock signal CLK. The lower gate terminal G52 of the fifth transistor T5 may be electrically connected to the upper gate terminal G51. The first terminal of the fifth transistor T5 may receive the input signal SIN. The second terminal of the fifth transistor T5 may be connected to the first node N1. The fifth transistor T5 may transmit the input signal SIN to the first node N1 in response to the clock signal CLK.

In an embodiment, the semiconductor material SC1 may be connected to the upper gate terminal G51 and the lower gate terminal G52, and may function as a Schottky diode. In this case, each of a work function of the upper gate terminal G51 and a work function of the lower gate terminal G52 may be greater than a work function of the semiconductor material SC1. That is, in the fifth transistor T5, the upper gate terminal G51 and the lower gate terminal G52 may be electrically connected through the semiconductor material SC1, and the semiconductor material SC1 may make Schottky contact with the upper gate terminal G51 and the lower gate terminal G52.

When an upper gate terminal and a lower gate terminal of a transistor are electrically connected to a Schottky diode, a depletion region may be formed. In the depletion region, as a voltage VLG applied to the lower gate terminal decreases, a threshold voltage VTH of the transistor may increase (see FIG. 6).

Since the upper gate terminal G51 and the lower gate terminal G52 are connected to the semiconductor material SC1, a voltage different from a voltage applied to the upper gate terminal G51 may be applied to the lower gate terminal G52, and a threshold voltage of the fifth transistor T5 may be adjusted. In an embodiment, a voltage lower than the voltage applied to the upper gate terminal G51 may be applied to the lower gate terminal G52, and the threshold voltage of the fifth transistor T5 may increase.

The stage 100 may include an inverter chain including an even number of inverters INV1 and INV2 connected in series. In an embodiment, the stage 100 may include a first inverter INV1 and a second inverter INV2 connected in series.

The first inverter INV1 may include an input terminal connected to the first node N1 and an output terminal connected to the second node N2. The first inverter INV1 may invert a voltage of the first node N1. In addition, the second inverter INV2 may include an input terminal connected to the second node N2 and an output terminal connected to an output node NO. The second inverter INV2 may invert a voltage of the second node N2 and generate an output signal OUT. Accordingly, the output signal OUT having a voltage corresponding to the voltage of the first node N1 may be output from the output node NO.

The first inverter INV1 may include the second transistor T2 and the sixth transistor T6. In an embodiment, the second transistor T2 and the sixth transistor T6 may be connected in series.

In an embodiment, the second transistor T2 may be a PMOS transistor, and the sixth transistor T6 may be an NMOS transistor. That is, the first inverter INV1 may be implemented as a CMOS inverter including the second transistor T2 and the sixth transistor T6.

The second transistor T2 may include a gate terminal G2, a first terminal, and a second terminal. The gate terminal G2 of the second transistor T2 may be connected to the first node N1. The first terminal of the second transistor T2 may receive a high gate voltage VGH. The second terminal of the second transistor T2 may be connected to the second node N2. When the voltage of the first node N1 is at a low level, the second transistor T2 may transmit the high gate voltage VGH to the second node N2 in response to the voltage of the first node N1.

The sixth transistor T6 may include an upper gate terminal G61, a lower gate terminal G62, a first terminal, a second terminal, and a semiconductor material SC2. The upper gate terminal G61 of the sixth transistor T6 may be connected to the first node N1. The lower gate terminal G62 of the sixth transistor T6 may be electrically connected to the upper gate terminal G61. The first terminal of the sixth transistor T6 may receive a low gate voltage VGL. The second terminal of the sixth transistor T6 may be connected to the second node N2. When the voltage of the first node N1 is at a high level, the sixth transistor T6 may transmit the low gate voltage VGL to the second node N2 in response to the voltage of the first node N1.

In an embodiment, the semiconductor material SC1 may be connected to the upper gate terminal G61 and the lower gate terminal G62, and may function as a Schottky diode. In this case, each of a work function of the upper gate terminal G61 and a work function of the lower gate terminal G62 may be greater than a work function of the semiconductor material SC2. That is, in the sixth transistor T6, the upper gate terminal G61 and the lower gate terminal G62 may be electrically connected through the semiconductor material SC2, and the semiconductor material SC2 may make Schottky contact with the upper gate terminal G61 and the lower gate terminal G62.

Accordingly, a voltage different from a voltage applied to the upper gate terminal G61 may be applied to the lower gate terminal G62, and a threshold voltage of the sixth transistor T6 may be adjusted. In an embodiment, a voltage lower than the voltage applied to the upper gate terminal G61 may be applied to the lower gate terminal G62, and the threshold voltage of the sixth transistor T6 may increase.

The second inverter INV2 may include the third transistor T3 and the seventh transistor T7. In an embodiment, the third transistor T3 and the seventh transistor T7 may be connected in series.

In an embodiment, the third transistor T3 may be a PMOS transistor, and the seventh transistor T7 may be an NMOS transistor. That is, the second inverter INV2 may be implemented as a CMOS inverter including the third transistor T3 and the seventh transistor T7.

The third transistor T3 may include a gate terminal G3, a first terminal, and a second terminal. The gate terminal G3 of the third transistor T3 may be connected to the second node N2. The first terminal of the third transistor T3 may receive the high gate voltage VGH. The second terminal of the third transistor T3 may be connected to the output node NO. When a voltage of the second node N2 is at a low level, the third transistor T3 may transmit the high gate voltage VGH to the output node NO in response to the voltage of the second node N2.

The seventh transistor T7 may include an upper gate terminal G71, a lower gate terminal G72, a first terminal, a second terminal, and a semiconductor material SC3. The upper gate terminal G71 of the seventh transistor T7 may be connected to the second node N2. The lower gate terminal G72 of the seventh transistor T7 may be electrically connected to the upper gate terminal G71. The first terminal of the seventh transistor T7 may receive the low gate voltage VGL. The second terminal of the seventh transistor T7 may be connected to the output node NO. When the voltage of the second node N2 is at a high level, the seventh transistor T7 may transmit the low gate voltage VGL to the output node NO in response to the voltage of the second node N2.

In an embodiment, the semiconductor material SC3 may be connected to the upper gate terminal G71 and the lower gate terminal G72, and may function as a Schottky diode. In this case, each of a work function of the upper gate terminal G71 and a work function of the lower gate terminal G72 may be greater than a work function of the semiconductor material SC3. That is, in the seventh transistor T7, the upper gate terminal G71 and the lower gate terminal G72 may be electrically connected through the semiconductor material SC3, and the semiconductor material SC3 may make Schottky contact with the upper gate terminal G71 and the lower gate terminal G72.

Accordingly, a voltage different from a voltage applied to the upper gate terminal G71 may be applied to the lower gate terminal G72, and a threshold voltage of the seventh transistor T7 may be adjusted. In an embodiment, a voltage lower than the voltage applied to the upper gate terminal G71 may be applied to the lower gate terminal G72, and the threshold voltage of the seventh transistor T7 may increase.

The fourth transistor T4 may include a gate terminal G4, a first terminal, and a second terminal. The gate terminal G4 of the fourth transistor T4 may receive a global reset signal ESR. The first terminal of the fourth transistor T4 may receive the high gate voltage VGH. The second terminal of the fourth transistor T4 may be connected to the first node N1. When a power-on sequence of a display device is performed, the fourth transistor T4 may transmit the high gate voltage VGH to the first node N1 in response to the global reset signal ESR. Accordingly, the fourth transistor T4 may stabilize the voltage of the first node N1 during the power-on sequence.

In FIG. 5, the fourth transistor T4 is illustrated as receiving the high gate voltage VGH, but the present disclosure is not limited thereto. In another embodiment, the first terminal of the fourth transistor T4 may receive the low gate voltage VGL. In this case, the fourth transistor T4 may transmit the low gate voltage VGL to the first node N1 in response to the global reset signal ESR during the power-on sequence.

The storage capacitor CST may include a first terminal and a second terminal. The first terminal of the storage capacitor CST may receive the high gate voltage VGH. The second terminal of the storage capacitor CST may be connected to the first node N1. The storage capacitor CST may maintain the voltage of the first node N1 while the first transistor T1 and the fifth transistor T5 of the input circuit INC are turned off.

In FIG. 5, the storage capacitor CST is illustrated as receiving the high gate voltage VGH, but the present disclosure is not limited thereto. In another embodiment, the first terminal of the storage capacitor CST may receive the low gate voltage VGL.

Figure 7:
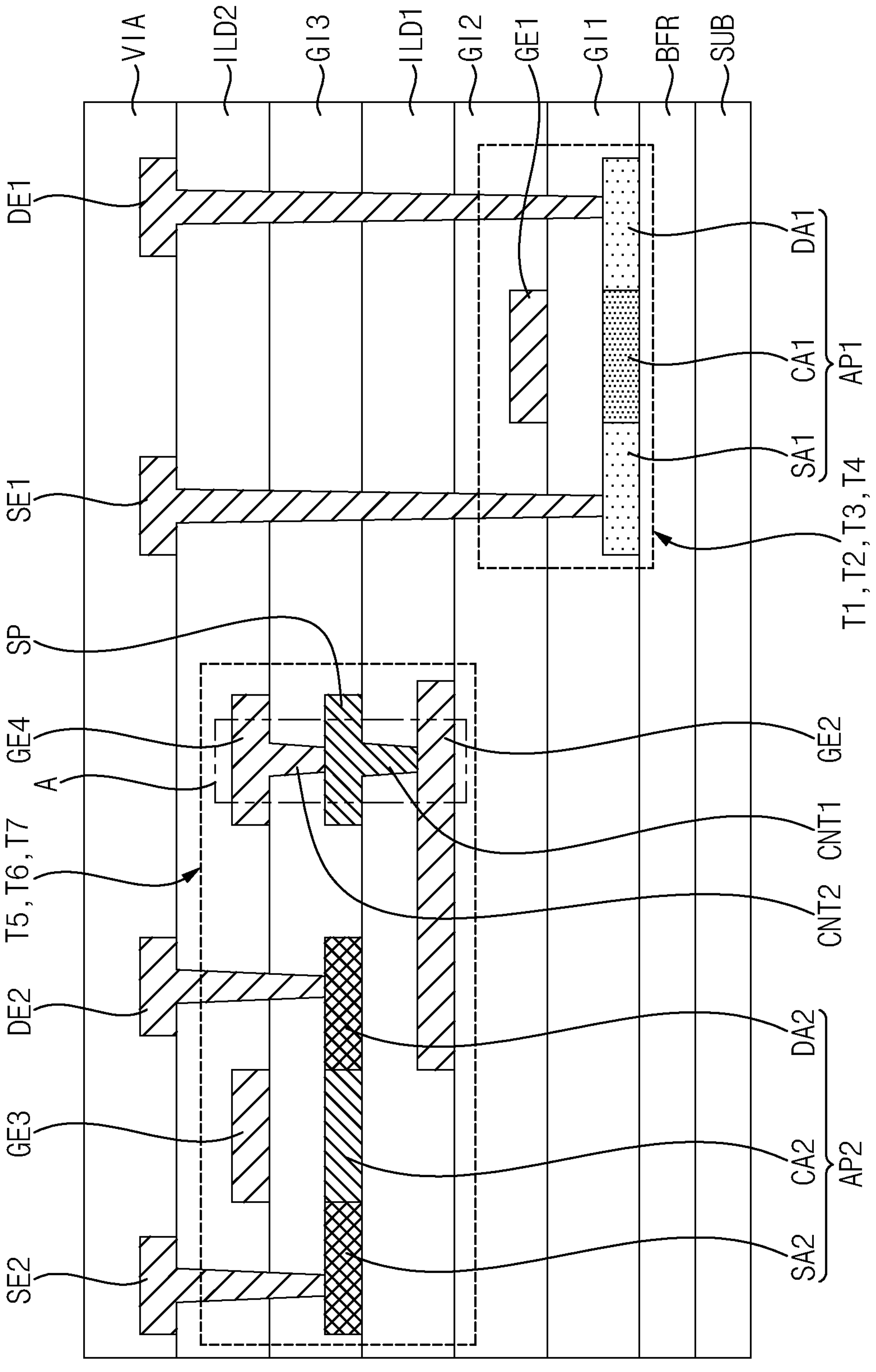
FIG. 7 is a cross-sectional view illustrating an example of transistors included in the stage of FIG. 5.
Figure 8:
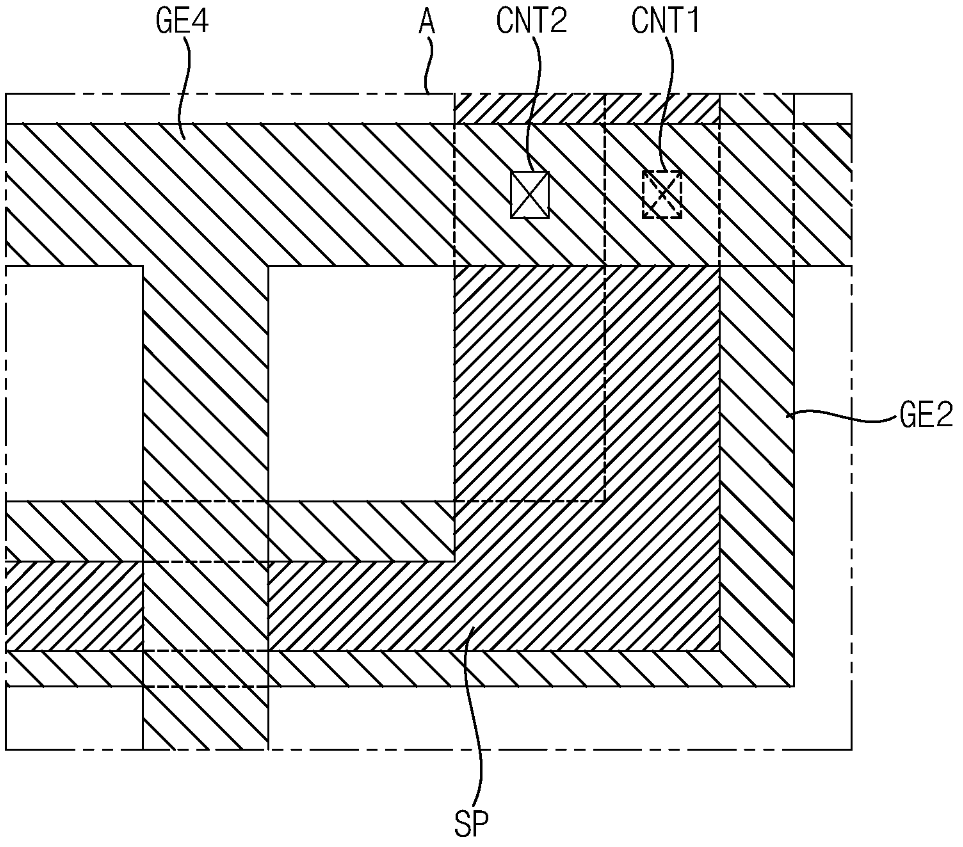
FIG. 8 is an enlarged plan view of area A of FIG. 7.

FIG. 7 is a cross-sectional view illustrating an example of transistors included in the stage of FIG. 5. FIG. 8 is an enlarged plan view of area A of FIG. 7.

Referring to FIGS. 5, 7, and 8, the stage 100 may include a substrate SUB, a buffer layer BFR, a first active pattern AP1, a first gate insulating layer GI1, a first gate electrode GE1, a second gate insulating layer GI2, a second gate electrode GE2, a first interlayer insulating layer ILD1, a second active pattern AP2, a semiconductor pattern SP, a third gate insulating layer GI3, a third gate electrode GE3, a fourth gate electrode GE4, a second interlayer insulating layer ILD2, a first source electrode SE1, a first drain electrode DE1, a second source electrode SE2, a second drain electrode DE2, and a via insulating layer VIA.

The substrate SUB may include a transparent or opaque material. The substrate SUB may include glass, quartz, plastic, or the like. These may be used alone or in combination with each other.

The buffer layer BFR may be disposed on the substrate SUB. The buffer layer BFR may prevent metal atoms or impurities from being diffused from the substrate SUB to transistors. In addition, the buffer layer BFR may improve a flatness of a surface of the substrate SUB when the surface of the substrate SUB is not uniform. The buffer layer BFR may include an inorganic material such as silicon oxide ($SiO_x$), silicon nitride ($SiN_x$), silicon carbide ($SiC_x$), silicon oxynitride ($SiO_xN_y$), silicon oxycarbide ($SiO_xC_y$), or the like. These may be used alone or in combination with each other.

The first active pattern AP1 may be disposed on the buffer layer BFR. The first active pattern AP1 may include a source area SA1, a drain area DA1, and a channel area CA1 positioned between the source area SA1 and the drain area DA1. In an embodiment, the first active pattern AP1 may include a silicon semiconductor material. Examples of the silicon semiconductor material may include amorphous silicon, polycrystalline silicon, or the like. These may be used alone or in combination with each other.

In an embodiment, the first active pattern AP1 may include a P-type impurity. For example, the P-type impurity may include boron (B) ions. The P-type impurity may be doped into the source area SA1 and the drain area DA1 of the first active pattern AP1. For example, the first active pattern AP1 may correspond to the first terminals and the second terminals of the first, second, third, and fourth transistors T1, T2, T3, and T4.

The first gate insulating layer GI1 may be disposed on the buffer layer BFR, and may cover the first active pattern AP1. The first gate insulating layer GI1 may include an inorganic material such as silicon oxide, silicon nitride, silicon carbide, silicon oxynitride, silicon oxy carbide, or the like. These may be used alone or in combination with each other.

The first gate electrode GE1 may be disposed on the first gate insulating layer GI1. The first gate electrode GE1 may overlap the channel area CA1 of the first active pattern AP1. The first gate electrode GE1 may include metal, alloy, conductive metal oxide, metal nitride, or the like. Examples of the metal may include silver (Ag), molybdenum (Mo), aluminum (Al), tungsten (W), copper (Cu), nickel (Ni), chromium (Cr), titanium (Ti), tantalum (Ta), platinum (Pt), scandium (Sc), or the like. Examples of the conductive metal oxide may include indium tin oxide, indium zinc oxide, or the like. Examples of the metal nitride may include aluminum nitride ($AlN_x$), tungsten nitride ($WN_x$), chromium nitride ($CrN_x$), or the like. These may be used alone or in combination with each other. For example, the first gate electrode GE1 may correspond to the gate terminals G1, G2, G3, and G4 of the first, second, third, and fourth transistors T1, T2, T3, and T4.

The second gate insulating layer GI2 may be disposed on the first gate insulating layer GI1, and may cover the first gate electrode GE1. The second gate insulating layer GI2 may include an inorganic material such as silicon oxide, silicon nitride, silicon carbide, silicon oxynitride, silicon oxycarbide, or the like. These may be used alone or in combination with each other.

The second gate electrode GE2 may be disposed on the second gate insulating layer GI2. The second gate electrode GE2 may include metal, alloy, conductive metal oxide, metal nitride, or the like. Examples of the metal may include silver, molybdenum, aluminum, tungsten, copper, nickel, chromium, titanium, tantalum, platinum, scandium, or the like. Examples of the conductive metal oxide may include indium tin oxide, indium zinc oxide, or the like. Examples of the metal nitride may include aluminum nitride, tungsten nitride, chromium nitride, or the like. These may be used alone or in combination with each other. For example, the second gate electrode GE2 may correspond to the lower gate terminals G52, G62, and G72 of the fifth, sixth, and seventh transistors T5, T6, and T7.

The first interlayer insulating layer ILD1 may be disposed on the second gate insulating layer GI2, and may cover the second gate electrode GE2. The first interlayer insulating layer ILD1 may include an inorganic material such as silicon oxide, silicon nitride, silicon carbide, silicon oxynitride, silicon oxycarbide, or the like. These may be used alone or in combination with each other.

The second active pattern AP2 and the semiconductor pattern SP may be disposed on the first interlayer insulating layer ILD1. The second active pattern AP2 and the semiconductor pattern SP may be disposed on a same layer. In an embodiment, the second active pattern AP2 and the semiconductor pattern SP may be spaced apart from each other. The second active pattern AP2 and the semiconductor pattern SP may include a same material, and may be disposed on a same layer. That is, the second active pattern AP2 and the semiconductor pattern SP may be formed through a same process by using a same material.

Each of the second active pattern AP2 and the semiconductor pattern SP may include a material different from a material of the first active pattern AP1. In an embodiment, each of the second active pattern AP2 and the semiconductor pattern SP may include an oxide semiconductor material. Examples of the oxide semiconductor material may include indium gallium zinc oxide, indium tin zinc oxide, or the like. These may be used alone or in combination with each other.

The second active pattern AP2 may include a source area SA2, a drain area DA2, and a channel area CA2 positioned between the source area SA2 and the drain area DA2. In an embodiment, the second active pattern AP2 may include an N-type impurity. For example, the N-type impurity may include phosphorus (P) ions. The N-type impurity may be doped into the source area SA2 and the drain area DA2 of the second active pattern AP2. For example, the second active pattern AP2 may correspond to the first terminals and the second terminals of the fifth, sixth, and seventh transistors T5, T6, and T7.

The semiconductor pattern SP may be in contact with the second gate electrode GE2 through a first contact hole CNT1 penetrating a portion of the first interlayer insulating layer ILD1. In an embodiment, a work function of the second gate electrode GE2 may be greater than a work function of the semiconductor pattern SP.

For example, the second gate electrode GE2 may include copper, and the semiconductor pattern SP may include indium gallium zinc oxide. In this case, the work function of the second gate electrode GE2 may be about 4.53 eV to about 5.10 eV, and the work function of the semiconductor pattern SP may be about 4.0 eV. For another example, the second gate electrode GE2 may include at least one of aluminum and titanium, and the semiconductor pattern SP may include indium gallium zinc oxide. In this case, the work function of the second gate electrode GE2 may be about 4.06 eV to about 4.33 eV. For still another example, the second gate electrode GE2 may include molybdenum, and the semiconductor pattern SP may include indium gallium zinc oxide. In this case, the work function of the second gate electrode GE2 may be about 4.53 eV to about 5.10 eV.

Accordingly, the semiconductor pattern SP and the second gate electrode GE2 may be in Schottky contact through the first contact hole CNT1. For example, the semiconductor pattern SP may correspond to the semiconductor materials SC1, SC2, and SC3 of the fifth, sixth, and seventh transistors T5, T6, and T7.

The third gate insulating layer GI3 may be disposed on the first interlayer insulating layer ILD1, and may cover the second active pattern AP2 and the semiconductor pattern SP. The third gate insulating layer GI3 may include an inorganic material such as silicon oxide, silicon nitride, silicon carbide, silicon oxynitride, silicon oxycarbide, or the like. These may be used alone or in combination with each other.

The third gate electrode GE3 and the fourth gate electrode GE4 may be disposed on the third gate insulating layer GI3. The third gate electrode GE3 and the fourth gate electrode GE4 may include a same material, and may be disposed on a same layer. That is, the third gate electrode GE3 and the fourth gate electrode GE4 may be formed through a same process by using a same material.

The third gate electrode GE3 and the fourth gate electrode GE4 may include metal, alloy, conductive metal oxide, metal nitride, or the like. Examples of the metal may include silver, molybdenum, aluminum, tungsten, copper, nickel, chromium, titanium, tantalum, platinum, scandium, or the like. Examples of the conductive metal oxide may include indium tin oxide, indium zinc oxide, or the like. Examples of the metal nitride may include aluminum nitride, tungsten nitride, chromium nitride, or the like. These may be used alone or in combination with each other.

The third gate electrode GE3 may overlap the channel area CA2 of the second active pattern AP2. For example, the third gate electrode GE3 may correspond to the upper gate terminals G51, G61, and G71 of the fifth, sixth, and seventh transistors T5, T6, and T7.

The fourth gate electrode GE4 may be in contact with the semiconductor pattern SP through a second contact hole CNT2 penetrating a portion of the third gate insulating layer GI3. Accordingly, the second gate electrode GE2 and the fourth gate electrode GE4 may be electrically connected. In an embodiment, a work function of the fourth gate electrode GE4 may be greater than the work function of the semiconductor pattern SP.

For example, the fourth gate electrode GE4 may include copper, and the semiconductor pattern SP may include indium gallium zinc oxide. For another example, the fourth gate electrode GE4 may include at least one of aluminum and titanium, and the semiconductor pattern SP may include indium gallium zinc oxide. For still another example, the fourth gate electrode GE4 may include molybdenum, and the semiconductor pattern SP may include indium gallium zinc oxide.

Accordingly, the fourth gate electrode GE4 and the semiconductor pattern SP may be in Schottky contact through the second contact hole CNT2. For example, the fourth gate electrode GE4 may correspond to the upper gate terminals G51, G61, and G71 of the fifth, sixth, and seventh transistors T5, T6, and T7.

The second interlayer insulating layer ILD2 may be disposed on the third gate insulating layer GI3, and may cover the third gate electrode GE3 and the fourth gate electrode GE4. The second interlayer insulating layer ILD2 may include an inorganic material such as silicon oxide, silicon nitride, silicon carbide, silicon oxynitride, silicon oxycarbide, or the like. These may be used alone or in combination with each other.

The first source electrode SE1, the first drain electrode DE1, the second source electrode SE2, and the second drain electrode DE2 may be disposed on the second interlayer insulating layer ILD2. The first source electrode SE1, the first drain electrode DE1, the second source electrode SE2, and the second drain electrode DE2 may include a same material, and may be disposed on a same layer. That is, the first source electrode SE1, the first drain electrode DE1, the second source electrode SE2, and the second drain electrode DE2 may be formed through a same process using a same material.

The first source electrode SE1, the first drain electrode DE1, the second source electrode SE2, and the second drain electrode DE2 may include metal, alloy, conductive metal oxide, metal nitride, or the like. Examples of the metal may include silver, molybdenum, aluminum, tungsten, copper, nickel, chromium, titanium, tantalum, platinum, scandium, or the like. Examples of the conductive metal oxide may include indium tin oxide, indium zinc oxide, or the like. Examples of the metal nitride may include aluminum nitride, tungsten nitride, chromium nitride, or the like. These may be used alone or in combination with each other.

The first source electrode SE1 may be in contact with the source area SA1 of the first active pattern AP1 through a contact hole penetrating portions of the first, second, and third gate insulating layers GI1, GI2, and GI3 and the first and second interlayer insulating layers ILD1 and ILD2. The first drain electrode DE1 may be in contact with the drain area DA1 of the first active pattern AP1 through a contact hole penetrating portions of the first, second, and third gate insulating layers GI1, GI2, and GI3 and the first and second interlayer insulating layers ILD1 and ILD2.

In addition, the second source electrode SE2 may be in contact with the source area SA2 of the second active pattern AP2 through a contact hole penetrating portions of the third gate insulating layer GI3 and the second interlayer insulating layer ILD2. The second drain electrode DE2 may be in contact with the drain area DA2 of the second active pattern AP2 through a contact hole penetrating portions of the third gate insulating layer GI3 and the second interlayer insulating layer ILD2.

Accordingly, the first, second, third, and fourth transistors T1, T2, T3 and T4 including the first active pattern AP1, the first gate electrode GE1, the first source electrode SE1, and the first drain electrode DE1 may be disposed on the substrate SUB.

In addition, the fifth, sixth, and seventh transistors T5, T6, and T7 including the second gate electrode GE2, the second active pattern AP2, the semiconductor pattern SP, the third gate electrode GE3, the fourth gate electrode GE4, the second source electrode SE2, and the second drain electrode DE2 may be disposed on the substrate SUB.

The via insulating layer VIA may be disposed on the second interlayer insulating layer ILD2, and may cover the first source electrode SE1, the first drain electrode DE1, the second source electrode SE2, and the second drain electrode DE2. The via insulating layer VIA may include an organic material such as phenol resin, acrylic resin, polyimide resin, polyamide resin, siloxane resin, epoxy resin, or the like. These may be used alone or in combination with each other.

Figure 9:
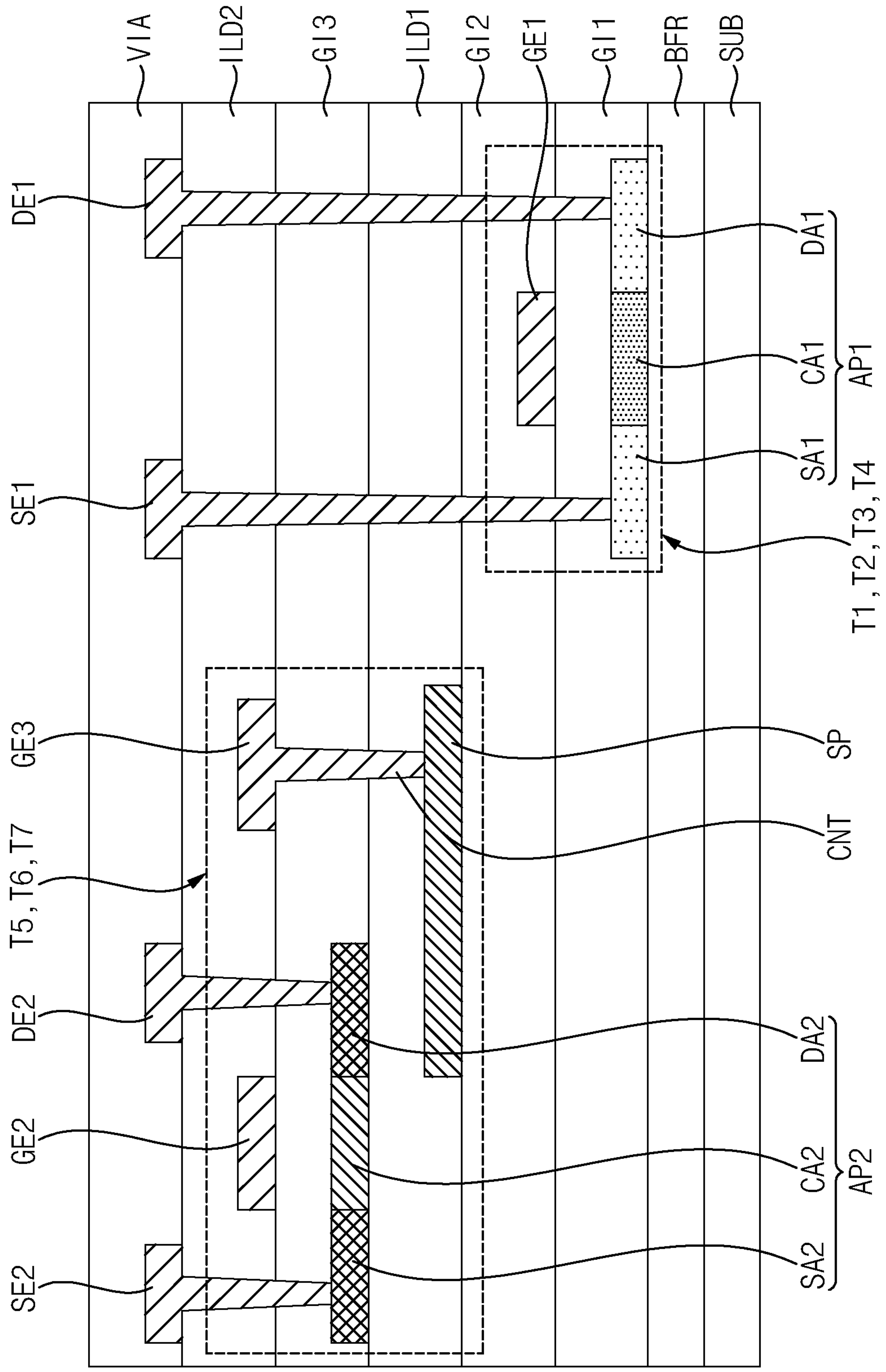
FIG. 9 is a cross-sectional view illustrating another example of transistors included in the stage of FIG. 5.

FIG. 9 is a cross-sectional view illustrating another example of transistors included in the stage of FIG. 5.

Hereinafter, descriptions overlapping the stage 100 described with reference to FIG. 7 will be omitted or simplified.

Referring to FIGS. 5 and 9, the stage 100 may include a substrate SUB, a buffer layer BFR, a first active pattern AP1, the first gate insulating layer GI1, a first gate electrode GE1, a second gate insulating layer GI2, a semiconductor pattern SP, a first interlayer insulating layer ILD1, a second active pattern AP2, a third gate insulating layer GI3, a second gate electrode GE2, a third gate electrode GE3, a second interlayer insulating layer ILD2, a first source electrode SE1, a first drain electrode DE1, a second source electrode SE2, a second drain electrode DE2, and a via insulating layer VIA.

The buffer layer BFR, the first active pattern AP1, the first gate insulating layer GI1, the first gate electrode GE1, and the second gate insulating layer GI2 may be sequentially disposed on the substrate SUB.

The semiconductor pattern SP may be disposed on the second gate insulating layer GI2. In an embodiment, the semiconductor pattern SP may include an oxide semiconductor material. Examples of the oxide semiconductor material may include indium gallium zinc oxide, indium tin zinc oxide, or the like. These may be used alone or in combination with each other. For example, the semiconductor pattern SP may correspond to the lower gate terminals G52, G62, and G72 and the semiconductor materials SC1, SC2, and SC3 of the fifth, sixth, and seventh transistors T5, T6, and T7.

The first interlayer insulating layer ILD1, the second active pattern AP2, and the third gate insulating layer GI3 may be sequentially disposed on the second gate insulating layer GI2.

The second gate electrode GE2 and the third gate electrode GE3 may be disposed on the third gate insulating layer GI3. The second gate electrode GE2 and the third gate electrode GE3 may be formed through a same process using a same material. The second gate electrode GE2 and the third gate electrode GE3 may include metal, alloy, conductive metal oxide, metal nitride, or the like.

The second gate electrode GE2 may overlap a channel area CA2 of the second active pattern AP2. For example, the second gate electrode GE2 may correspond to the upper gate terminals G51, G61, and G71 of the fifth, sixth, and seventh transistors T5, T6, and T7.

The third gate electrode GE3 may be in contact with the semiconductor pattern SP through a contact hole CNT penetrating portions of the first interlayer insulating layer ILD1 and the third gate insulating layer GI3. Accordingly, the semiconductor pattern SP and the third gate electrode GE3 may be electrically connected. In an embodiment, a work function of the third gate electrode GE3 may be greater than a work function of the semiconductor pattern SP.

For example, the third gate electrode GE3 may include copper, and the semiconductor pattern SP may include indium gallium zinc oxide. For another example, the third gate electrode GE3 may include at least one of aluminum and titanium, and the semiconductor pattern SP may include indium gallium zinc oxide. For still another example, the third gate electrode GE3 may include molybdenum, and the semiconductor pattern SP may include indium gallium zinc oxide.

Accordingly, the semiconductor pattern SP and the third gate electrode GE3 may be in Schottky contact through the contact hole CNT. For example, the third gate electrode GE3 may correspond to the upper gate terminals G51, G61, and G71 of the fifth, sixth, and seventh transistors T5, T6, and T7.

The second interlayer insulating layer ILD2, the first source electrode SE1, the first drain electrode DE1, the second source electrode SE2, the second drain electrode DE2, and the via insulating layer VIA may be sequentially disposed on the third gate insulating layer GI3.

Accordingly, the fifth, sixth, and seventh transistors T5, T6, and T7 including the semiconductor pattern SP, the second active pattern AP2, the second gate electrode GE2, the third gate electrode GE3, the second source electrode SE2, and the second drain electrode DE2 may be disposed on the substrate SUB.

The stage 100 of the driver DV according to an embodiment of the present disclosure may include the first, second, third, and fourth transistors T1, T2, T3, and T4 including a silicon semiconductor and the fifth, sixth, and seventh transistors T5, T6, and T7 including an oxide semiconductor. In this case, in the fifth, sixth, and seventh transistors T5, T6, and T7, the upper gate terminals G51, G61, and G71 and the lower gate terminals G52, G62, and G72 may be electrically connected through the semiconductor materials SC1, SC2, and SC3. Since the work function of the upper gate terminals G51, G61, and G71 and the work function of the lower gate terminals G52, G62, and G72 are greater than the work function of the semiconductor materials SC1, SC2, and SC3, the voltage applied to each of the lower gate terminals G52, G62, and G72 may be lowered, and the threshold voltage of each of the fifth, sixth, and seventh transistors T5, T6, and T7 may increase.

In addition, since the fifth, sixth, and seventh transistors T5, T6, and T7 have a double gate structure including the upper gate terminals G51, G61, and G71 and the lower gate terminals G52, G62, and G72, output current may increase. Accordingly, the driver DV may require a relatively small number of buffer transistors, and thus a dead space of the display device DD may be reduced.

In addition, each of the first, second, third, and fourth transistors T1, T2, T3, and T4 may be a PMOS transistor, and each of the fifth, sixth, and seventh transistors T5, T6, and T7 may be an NMOS transistor. As the stage 100 of the driver DV includes a CMOS circuit, power consumption of the driver DV and the display device DD may be reduced.

Figure 10:
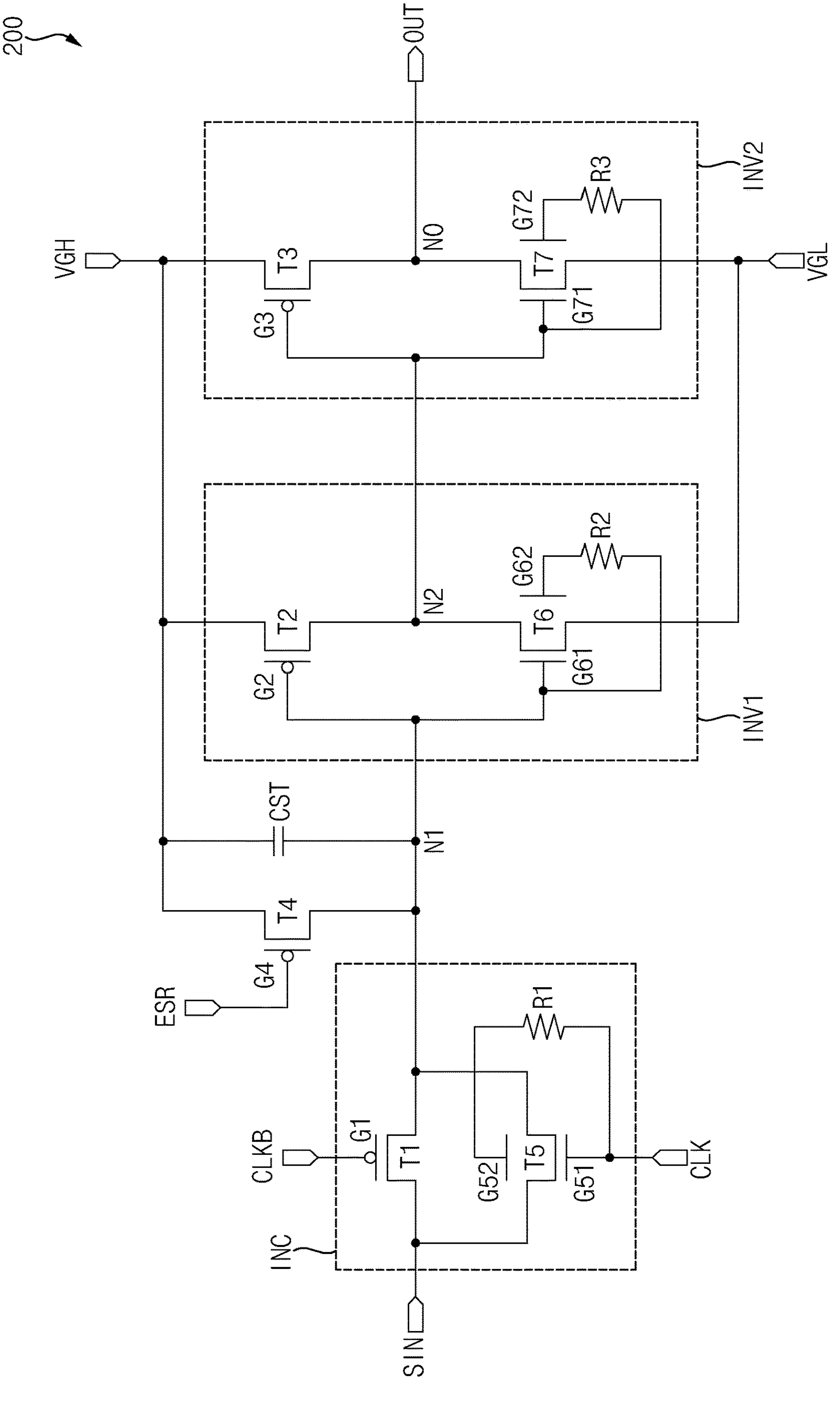
FIG. 10 is a circuit diagram illustrating a stage of a driver according to another embodiment of the present disclosure.

FIG. 10 is a circuit diagram illustrating a stage of a driver according to another embodiment of the present disclosure.

Hereinafter, descriptions overlapping the stage 100 described with reference to FIG. 5 will be omitted or simplified.

Referring to FIG. 10, a stage 200 may include an input circuit INC, a first inverter INV1, and a second inverter INV2. In addition, the stage 200 may include a first transistor T1, a second transistor T2, a third transistor T3, a fourth transistor T4, a fifth transistor T5, a sixth transistor T6, a seventh transistor T7, and a storage capacitor CST.

The input circuit INC may transmit an input signal SIN to a first node N1 in response to at least one of a clock signal CLK and an inverted clock signal CLKB.

The input circuit INC may include the first transistor T1 and the fifth transistor T5 connected in parallel. In an embodiment, the first transistor T1 may be a PMOS transistor, and the fifth transistor T5 may be an NMOS transistor.

The first transistor T1 may include a gate terminal G1 that receives the inverted clock signal CLKB, a first terminal that receives the input signal SIN, and a second terminal connected to the first node N1.

The fifth transistor T5 may include an upper gate terminal G51 that receives the clock signal CLK, a lower gate terminal G52 electrically connected to the upper gate terminal G51, a first terminal that receives the input signal SIN, a second terminal connected to the first node N1, and a semiconductor material R1.

In an embodiment, the semiconductor material R1 may be connected to the upper gate terminal G51 and the lower gate terminal G52, and may function as a resistor. That is, in the fifth transistor T5, the upper gate terminal G51 and the lower gate terminal G52 may be electrically connected through the semiconductor material R1, and the semiconductor material R1 may make ohmic contact with the upper gate terminal G51 and the lower gate terminal G52.

Accordingly, a voltage different from a voltage applied to the upper gate terminal G51 may be applied to the lower gate terminal G52, and a threshold voltage of the fifth transistor T5 may be adjusted. In an embodiment, a voltage lower than the voltage applied to the upper gate terminal G51 may be applied to the lower gate terminal G52, and the threshold voltage of the fifth transistor T5 may increase.

The first inverter INV1 may invert a voltage of the first node N1. The first inverter INV1 may include the second transistor T2 and the sixth transistor T6 connected in series. In an embodiment, the second transistor T2 may be a PMOS transistor, and the sixth transistor T6 may be an NMOS transistor.

The second transistor T2 may include a gate terminal G2 connected to the first node N1, a first terminal that receives a high gate voltage VGH, and a second terminal connected to a second node N2.

The sixth transistor T6 may include an upper gate terminal G61 connected to the first node N1, a lower gate terminal G62 electrically connected to the upper gate terminal G61, a first terminal that receives a low gate voltage VGL, a second terminal connected to the second node N2, and a semiconductor material R2.

In an embodiment, the semiconductor material R2 may be connected to the upper gate terminal G61 and the lower gate terminal G62, and may function as a resistor. That is, in the sixth transistor T6, the upper gate terminal G61 and the lower gate terminal G62 may be electrically connected through the semiconductor material R2, and the semiconductor material R2 may make ohmic contact with the upper gate terminal G61 and the lower gate terminal G62.

Accordingly, a voltage different from a voltage applied to the upper gate terminal G61 may be applied to the lower gate terminal G62, and a threshold voltage of the sixth transistor T6 may be adjusted. In an embodiment, a voltage lower than the voltage applied to the upper gate terminal G61 may be applied to the lower gate terminal G62, and the threshold voltage of the sixth transistor T6 may increase.

The second inverter INV2 may invert a voltage of the second node N2 and generate an output signal OUT. The second inverter INV2 may include the third transistor T3 and the seventh transistor T7 connected in series. In an embodiment, the third transistor T3 may be a PMOS transistor, and the seventh transistor T7 may be an NMOS transistor.

The third transistor T3 may include a gate terminal G3 connected to the second node N2, a first terminal that receives the high gate voltage VGH, and a second terminal connected to an output node NO.

The seventh transistor T7 may include an upper gate terminal G71 connected to the second node N2, a lower gate terminal G72 electrically connected to the upper gate terminal G71, a first terminal that receives the low gate voltage VGL, a second terminal connected to the output node NO, and a semiconductor material R3.

In an embodiment, the semiconductor material R3 may be connected to the upper gate terminal G71 and the lower gate terminal G72, and may function as a resistor. That is, in the seventh transistor T7, the upper gate terminal G71 and the lower gate terminal G72 may be electrically connected through the semiconductor material R3, and the semiconductor material R3 may make ohmic contact with the upper gate terminal G71 and the lower gate terminal G72.

Accordingly, a voltage different from a voltage applied to the upper gate terminal G71 may be applied to the lower gate terminal G72, and a threshold voltage of the seventh transistor T7 may be adjusted. In an embodiment, a voltage lower than the voltage applied to the upper gate terminal G71 may be applied to the lower gate terminal G72, and the threshold voltage of the seventh transistor T7 may increase.

The fourth transistor T4 may include a gate terminal G4 that receives a global reset signal ESR, a first terminal that receives the high gate voltage VGH, and a second terminal connected to the first node N1.

The storage capacitor CST may include a first terminal that receives the high gate voltage VGH and a second terminal connected to the first node N1.

Figure 11:
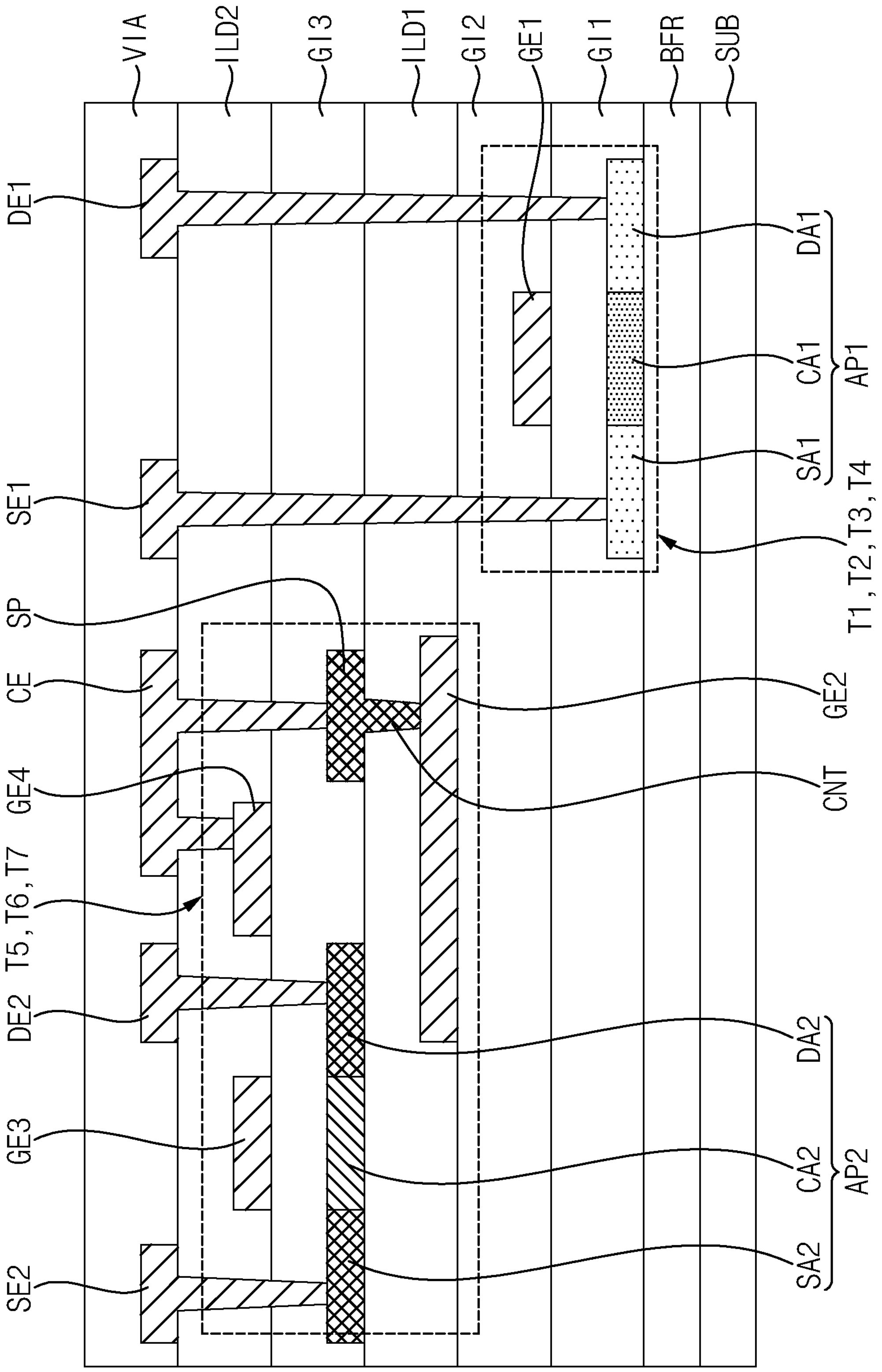
FIG. 11 is a cross-sectional view illustrating an example of transistors included in the stage of FIG. 10.

FIG. 11 is a cross-sectional view illustrating an example of transistors included in the stage of FIG. 10.

Hereinafter, descriptions overlapping the stage 100 described with reference to FIG. 7 will be omitted or simplified.

Referring to FIGS. 10 and 11, the stage 200 may include a substrate SUB, a buffer layer BFR, a first active pattern AP1, a first gate insulating layer GI1, a first gate electrode GE1, a second gate insulating layer GI2, a second gate electrode GE2, a first interlayer insulating layer ILD1, a second active pattern AP2, a semiconductor pattern SP, a third gate insulating layer GI3, a third gate electrode GE3, a fourth gate electrode GE4, a second interlayer insulating layer ILD2, a first source electrode SE1, a first drain electrode DE1, a second source electrode SE2, a second drain electrode DE2, a connection electrode CE, and a via insulating layer VIA.

The buffer layer BFR, the first active pattern AP1, the first gate insulating layer GI1, the first gate electrode GE1, the second gate insulating layer GI2, the second gate electrode GE2, and the first interlayer insulating layer ILD1 may be sequentially disposed on the substrate SUB.

The second active pattern AP2 and the semiconductor pattern SP may be disposed on the first interlayer insulating layer ILD1. The second active pattern AP2 and the semiconductor pattern SP may be disposed on a same layer. In an embodiment, the second active pattern AP2 and the semiconductor pattern SP may be spaced apart from each other. The second active pattern AP2 and the semiconductor pattern SP may be formed by a same process using a same material. In an embodiment, each of the second active pattern AP2 and the semiconductor pattern SP may include an oxide semiconductor material.

In an embodiment, the semiconductor pattern SP may include an N-type impurity. That is, the N-type impurity may be doped into a source area SA2 of the second active pattern AP2, a drain area DA2 of the second active pattern AP2, and the semiconductor pattern SP.

The semiconductor pattern SP may be in contact with the second gate electrode GE2 through a contact hole CNT penetrating a portion of the first interlayer insulating layer ILD1. As the N-type impurity is doped into the semiconductor pattern SP, the semiconductor pattern SP and the second gate electrode GE2 may be in ohmic contact through the contact hole CNT. For example, the semiconductor pattern SP may correspond to the semiconductor materials R1, R2, and R3 of the fifth, sixth, and seventh transistors T5, T6, and T7.

The third gate insulating layer GI3, the third gate electrode GE3, and the fourth gate electrode GE4 may be sequentially disposed on the first interlayer insulating layer ILD1.

The third gate electrode GE3 and the fourth gate electrode GE4 may be formed by a same process using a same material. The third gate electrode GE3 and the fourth gate electrode GE4 may include metal, alloy, conductive metal oxide, metal nitride, or the like.

The fourth gate electrode GE4 may be electrically connected to the second gate electrode GE2. In an embodiment, the fourth gate electrode GE4 may not overlap the semiconductor pattern SP in a plan view. In other words, the fourth gate electrode GE4 may be spaced apart from the semiconductor pattern SP in a plan view so that the semiconductor pattern SP may be doped with the N-type impurity. For example, the fourth gate electrode GE4 may correspond to the upper gate terminals G51, G61, and G71 of the fifth, sixth, and seventh transistors T5, T6, and T7.

The second interlayer insulating layer ILD2, the first source electrode SE1, the first drain electrode DE1, the second source electrode SE2, the second drain electrode DE2, and the connection electrode CE may be sequentially disposed on the third gate insulating layer GI3.

The first source electrode SE1, the first drain electrode DE1, the second source electrode SE2, the second drain electrode DE2, and the connection electrode CE may be formed through a same process using a same material. The first source electrode SE1, the first drain electrode DE1, the second source electrode SE2, the second drain electrode DE2, and the connection electrode CE may include metal, alloy, conductive metal oxide, metal nitride, or the like.

The connection electrode CE may be in contact with the semiconductor pattern SP through a contact hole penetrating portions of the third gate insulating layer GI3 and the second interlayer insulating layer ILD2. In addition, the connection electrode CE may be in contact with the fourth gate electrode GE4 through a contact hole penetrating a portion of the second interlayer insulating layer ILD2. Accordingly, the fourth gate electrode GE4 may be electrically connected to the semiconductor pattern SP and the second gate electrode GE2, and the fourth gate electrode GE4 and the semiconductor pattern SP may be in ohmic contact.

Accordingly, the fifth, sixth, and seventh transistors T5, T6, and T7 including the second gate electrode GE2, the second active pattern AP2, the semiconductor pattern SP, the third gate electrode GE3, the fourth gate electrode GE4, the second source electrode SE2, the second drain electrode DE2, and the connection electrode CE may be disposed on the substrate SUB.

The via insulating layer VIA may be disposed on the second interlayer insulating layer ILD2, and may cover the first source electrode SE1, the first drain electrode DE1, the second source electrode SE2, the second drain electrode DE2, and the connection electrode CE.

The stage 200 of the driver DV according to an embodiment of the present disclosure may include the first, second, third, and fourth transistors T1, T2, T3, and T4 including a silicon semiconductor and the fifth, sixth, and seventh transistors T5, T6, and T7 including an oxide semiconductor. In this case, in the fifth, sixth, and seventh transistors T5, T6, and T7, the upper gate terminals G51, G61, and G71 and the lower gate terminals G52, G62, and G72 may be electrically connected through the semiconductor materials R1, R2, and R3. Accordingly, the voltage applied to each of the lower gate terminals G52, G62, and G72 may be lowered, and the threshold voltage of each of the fifth, sixth, and seventh transistors T5, T6, and T7 may increase.

In addition, since the fifth, sixth, and seventh transistors T5, T6, and T7 have a double gate structure including the upper gate terminals G51, G61, and G71 and the lower gate terminals G52, G62, and G72, output current may increase. Accordingly, the driver DV may require a relatively small number of buffer transistors, and thus a dead space of the display device DD may be reduced.

In addition, each of the first, second, third, and fourth transistors T1, T2, T3, and T4 may be a PMOS transistor, and each of the fifth, sixth, and seventh transistors T5, T6, and T7 may be an NMOS transistor. As the stage 200 of the driver DV includes a CMOS circuit, power consumption of the driver DV and the display device DD may be reduced.

The present disclosure can be applied to a manufacturing process of various display devices. For example, the present disclosure is applicable to a manufacturing process of various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A driver comprising:

an input circuit that transmits an input signal to a first node in response to at least one of a clock signal and an inverted clock signal; and an inverter that generates an output signal based on a voltage of the first node, wherein each of the input circuit and the inverter includes a first transistor and a second transistor connected to each other, an active area of the first transistor and an active area of the second transistor include different materials, and a gate terminal of the second transistor is electrically connected to a semiconductor material spaced apart from the active area of the second transistor, wherein the gate terminal of the second transistor includes an upper gate terminal and a lower gate terminal, and the upper gate terminal is electrically connected to the lower gate terminal.

2. The driver of claim 1, wherein the semiconductor material is connected to the upper gate terminal and the lower gate terminal, and the upper gate terminal is electrically connected to the lower gate terminal through the semiconductor material.

3. The driver of claim 2, wherein the semiconductor material is in Schottky contact with the upper gate terminal and the lower gate terminal.

4. The driver of claim 3, wherein each of a work function of the upper gate terminal and a work function of the lower gate terminal is greater than a work function of the semiconductor material.

5. The driver of claim 2, wherein the semiconductor material is in ohmic contact with the upper gate terminal and the lower gate terminal.

6. The driver of claim 1, wherein the first transistor is a PMOS transistor, and the second transistor is an NMOS transistor.

7. The driver of claim 1, wherein the active area of the first transistor includes a silicon semiconductor, and the active area of the second transistor includes an oxide semiconductor.

8. The driver of claim 1, wherein the inverter includes:

a first inverter that inverts a voltage of the first node and provides an inverted voltage to a second node; and a second inverter that inverts a voltage of the second node and generates the output signal.

9. An electronic device comprising:

the driver of claim 1; and pixels electrically connected to the driver.

* * * * *